April 16, 1935. W. E. STITZ 1,997,983
CORN POPPING MACHINE
Filed May 24, 1934 2 Sheets-Sheet 2

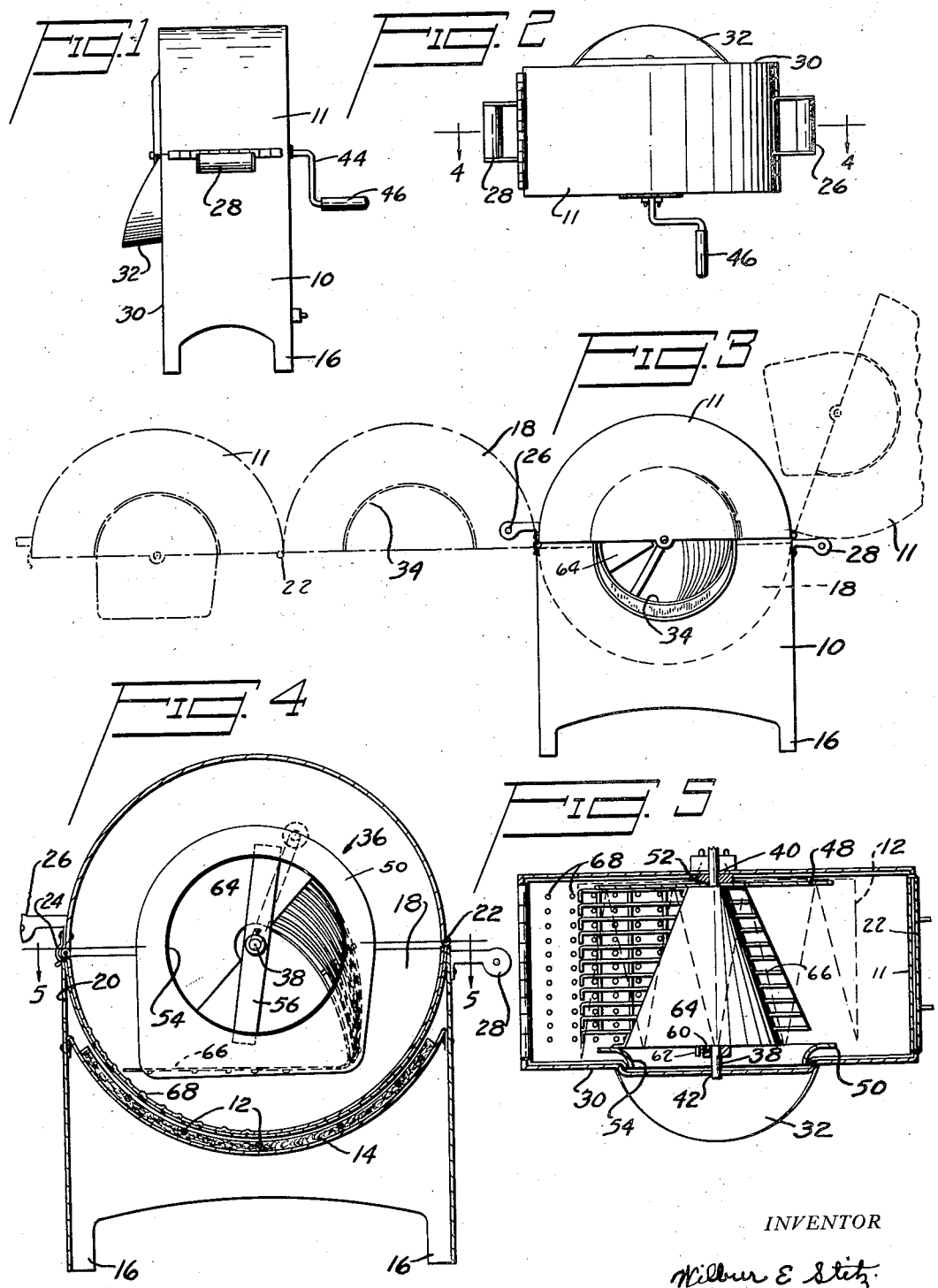

INVENTOR
Wilbur E. Stitz

Patented Apr. 16, 1935

1,997,983

UNITED STATES PATENT OFFICE 1,997,983

CORN POPPING MACHINE

Wilbur E. Stitz, Dayton, Ohio

Application May 24, 1934, Serial No. 727,252

18 Claims. (Cl. 53—4)

The present invention relates generally to corn popping machines and more particularly to a rotary corn popper for home use, of novel design and of small and compact arrangement.

The primary object of the present invention is to provide a corn popper of simple construction having a readily accessible popping receptacle so constructed and arranged that the popping of the corn may be accomplished with or without the use of cooking compound.

A further object of the present invention is to provide in a corn popper of this character, a normally stationary popping receptacle, and a relative rotatable element which cooperates with the popping receptacle in a manner such as to stir the unpopped corn and simultaneously separate the popped from the unpopped corn and discharge the same thru a central opening provided in the front of the popper. Thus the discharge of the popped corn can be maintained continuous without requiring the popper to be removed from the source of heat for charging and emptying, as is necessary in the convential type poppers.

A still further object of the present invention is to provide a corn popper in which the receptacle for popping the corn is entirely separate from the rotary stirring and separating element, each being of such construction as to permit of their being readily removed and cleaned.

Another object of the present invention is to provide a popping receptacle which is substantially semi-cylindrical in cross section, the bottom of which is provided with a plurality of teat like projections which cooperate with the rotating element to impart a rolling motion to the unpopped corn and thus effect a uniform distribution of heat thereto. Other objects of my invention are: to provide a portable corn popper embodying a heating element so that it does not require the use of a stove or other separate source of heat for its operation; to provide a corn popper of improved construction that can be used without danger of igniting surrounding materials, the support upon which it is placed, or of inflicting injury to the person while popping corn; to provide a corn popper which can be readily charged with unpopped corn and which will automatically discharge the popped corn into a conveniently placed receptacle; to provide a corn popper the popping receptacle of which can be readily emptied of its contents when desired; to provide an improved form of screen for separating the popped from the unpopped corn and for simultaneously stirring the unpopped corn and obtain uniformity in heat distribution; and to provide a corn popper comprising a base section, an upper section forming a closure for said base section and a popping receptacle hinged to said base and upper sections so as to permit raising of said upper section into open position for charging said popping receptacle with corn and for simultaneously emptying the popping receptacle.

With these and other ends in view, the invention comprises the various details of construction and arrangement of parts, to be more fully described hereinafter and set forth with particularity in the claims appended hereto.

In the accompanying drawings, which illustrate one embodiment of my invention:—

Fig. 1 is a side view of my invention.

Fig. 2 is a top plan view of Fig. 1.

Fig. 3 illustrates the pivoting action of the upper closure forming section.

Fig. 4 is an enlarged sectional view taken on the line 4—4 of Fig. 2, the rotating element being shown in plan form.

Fig. 5 is a sectional view taken on the line 5—5 of Fig. 4, and

Figure 6:
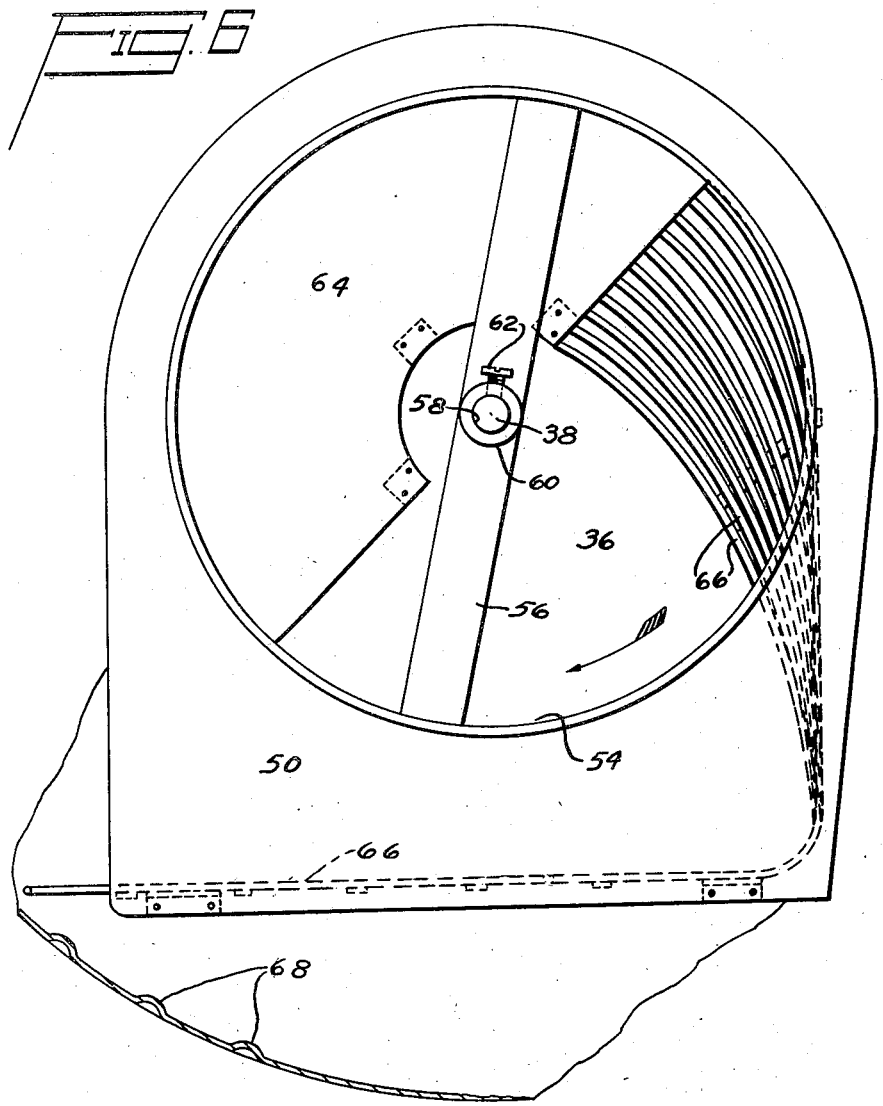
Fig. 6 is an enlarged detail front view of the rotary dispensing element illustrating the trough-like portion and screening fingers.

Referring more particularly to the drawings wherein corresponding parts are designated by like numerals throughout the several views thereof, the corn popper in the embodiment of my invention herein illustrated comprises generally a rectangular sheet metal base section 10 and an upper closure forming section 11.

The base section 10 is adapted to carry the heating element 12, which is incorporated in or carried by a refractory insulating support 14. The base section 10 is formed with suitable legs 16 by which the base section may be positioned on a table, counter or other suitable support.

The body of the base section is preferably made of hollow, open top, box form and adapted to receive in telescopic relation a popping receptacle 18, of semi-cylindrical shape. As shown in Figs. 3 and 4 the left hand end of the popping receptacle 18 is hinged to the end wall 20 of the base section. The opposite end of the popping receptacle is hinged, as at 22, to the lower end of the upper closure forming section 11. Consequently, the upper section can be readily swung into its open position as indicated in dotted lines in Fig. 3 to charge the popping receptacle with corn kernels or simultaneously move the popping receptacle into the dot-dash position indicated in this figure and empty the popping receptacle of corn which will not pop.

The insulating support 14, carrying the heating element 12, preferably is disposed below and equally spaced from the bottom of the popping receptacle so that the heat of the heating element will be evenly distributed throughout the entire surface area of the bottom of the receptacle.

A thin layer of insulation material, such for example as asbestos sheeting, (not shown) may be cemented to the inner walls of the base section and between the popping receptacle to further insulate the base section and obtain greater effectiveness of heat control. Any suitable latching device, as shown at 24, may be provided, for latching the upper closure forming section to the base section. Handles 26 and 28 attached to the upper closure forming section 11 and the base section 10, respectively, permit of the popper being readily carried about.

As shown in Figs. 3 and 5, the front wall 30 of the base section 10 is formed with a chute 32, which is provided for the purpose of receiving and discharging in a convenient receptacle the contents of the popper. To this end, the front wall of the popping receptacle is provided with an opening 34, which registers with the chute 32 when the popping receptacle is in normal operating position.

The numeral 36 generally indicates a revoluble element, constituting a dispensing device, for discharging the popped corn into a receiving receptacle exterior of the corn popper. As shown more particularly in Figs. 5 and 6 this revoluble element is mounted on and rotates with a central horizontally disposed shaft 38. This shaft is supported in bearings 40 and 42, formed in the side walls of the upper closure forming section 11. One end of the shaft 38 is projected beyond the upper section 11 and provided with a crank 44, which carries an operating handle 46.

The revoluble element 36, heretofore mentioned, comprises the back plate 48 and the front plate 50, the former being provided with an opening 52 forming a rear bearing for the shaft 38 and the latter being provided with a flanged circular secondary opening 54 which is in registry with the primary discharge opening 34 of the popping receptacle and the chute 32 heretofore mentioned. The front plate 50 is also provided with a strap 56 extending diametrically across the flanged opening 54, the latter being provided with a small circular opening 58 forming a front bearing for the shaft 38. The cross shaft 56 has secured thereto a sleeve 60 provided with a threaded opening for receiving a machine screw 62 so that the front plate may be securely locked to the shaft 38.

A conical trough-like portion 64 is carried by the front and back plates respectively, the rear transverse edge of which abuts the inner surface of the back plate 48 and the front transverse edge of which abuts the inner surface of the front plate 50. The trough-like portion 64 is concentrically arranged about the shaft 38, as shown in Fig. 6, with its front transverse edge coincidental with the secondary discharge opening 54, heretofore mentioned.

A screening portion consisting of a plurality of wire-like members 66 is carried between the front and back plates of the dispensing element. As shown in Fig. 6, these wirelike members extend approximately spirally transversely inward toward the axis of rotation of said dispensing element and terminate at their inner ends along the edge of the trough-like portion 64, heretofore mentioned. It should also be noted that these wire-like members extend over the open top of the conical portion 64. The outer ends of these wire-like members extend beyond the front and back plates and toward and adjacent to the inner bottom surface of the popping receptacle, heretofore mentioned, to form stirring fingers which cooperate with the popping receptacle to stir the unpopped corn and simultaneously separate the popped corn from the unpopped corn.

As will be noted, by referring to Fig. 6, the bottom of the popping receptacle is formed with a series of staggered teat-like projections 68. Consequently, as the dispensing element is rotated in the direction of the arrow "A", the main body of unpopped kernels, while being stirred, will be noticeably moved forwardly and upwardly along the curved surface of the bottom of the popping receptacle and thus imparted a rolling motion, under action of gravity. It therefore remains that the corn is automatically stirred and agitated so that uniformity in heat distribution is obtained. In being rotated in the direction of arrow "A", the fingers of the screening portion will pick up the popped corn in the bottom of the receptacle and convey it toward the floor of the trough-like portion 64. When the popped corn reaches the floor of the trough-like portion, it is directed toward and discharges through the opening 34 and chute 32 into a convenient receptacle. The distance between the wire-like members 66 is such that the unpopped kernels will not be picked up but will remain in the heated bottom of the popping receptacle.

From the foregoing, it will be seen that a very light, simple, and inexpensive corn popper has been provided, which may be used with either an electric element or over any other desired source of heat to quickly and efficiently pop the contents of the popper. To fill the popper it is only necessary to raise the closure forming section into the position indicated in Fig. 3. Obviously, a popper constructed in the manner set forth hereinabove, permits the popping of corn with or without the use of cooking compound, due to its ready accessibility, when the upper closure forming section is in a raised position.

I claim:

1. A corn popper comprising, a base section open at its upper end, an upper section forming a closure for said base section, a normally stationary popping receptacle disposed within the upper open end of said base section having a discharge opening provided therein, and rotatable means carried by one of said sections and revolvable relative to said popping receptacle for stirring the unpopped corn in said popping receptacle and simultaneously separating the popped from the unpopped corn and for intermittently discharging said popped corn through said discharge opening.

2. A corn popper comprising, a base section open at its upper end, an upper section forming a closure for said base section, a normally stationary popping receptacle disposed within the open upper end of said base section, having a discharge opening provided therein, and rotatable means carried by said upper section and revolvable relative to said popping receptacle for stirring the unpopped corn in said popping receptacle and simultaneously separating the popped from the unpopped corn and for intermittently discharging said popped corn through said discharge opening.

3. A corn popper comprising, a base section open at its upper end, an upper section forming a closure for said base section, a normally stationary popping receptacle disposed within the upper open end of said base section, having a discharge opening provided therein, a source of constant heat carried by said base section adapted for uniformly heating the bottom of said popping receptacle, and relatively rotatable means co-operating with said stationary popping receptacle for stirring the unpopped corn therein, simultaneously separating the popped from the unpopped corn and intermittently automatically discharging the popped corn through said discharge opening.

4. A corn popper comprising, a base section open at its upper end, an upper section forming a closure for said base section, a normally stationary popping receptacle disposed within the upper open end of said base section having a discharge opening provided therein, a heating element carried by said base section adjacent the bottom of said popping receptacle, and means carried by said upper section and rotatable relative to said popping receptacle for stirring the unpopped corn therein, simultaneously separating the popped from the unpopped corn and intermittently automatically discharging the popped corn through said discharge opening.

5. A corn popper comprising, a base section open at its upper end, an upper section forming a closure for said base section, a normally stationary popping receptacle, having a discharge opening provided therein, telescopically engaged within the open upper end of said base section and hinged to one side of said base section, and means carried by said upper section and rotatable relative to said popping receptacle for stirring the unpopped corn therein, simultaneously separating the popped from the unpopped corn and intermittently automatically discharging the popped corn through said discharge opening.

6. A corn popper comprising, a base section open at its upper end, an upper section forming a closure for said base section, a normally stationary popping receptacle, having a discharge opening provided therein, telescopically engaged within the open upper end of said base section and hinged at its opposite ends to said base and upper sections respectively, and means carried by said upper section and rotatable relative to said popping receptacle for stirring the unpopped corn therein, simultaneously separating the popped from the unpopped corn and intermittently automatically discharging the popped corn through said discharge opening.

7. A corn popper comprising, a base section open at its upper end, a normally stationary popping receptacle having a discharge opening provided therein, telescopically engaged within the open upper end of said base section and hinged to said section at one end thereof, an upper section forming a closure for said base section hinged to said popping receptacle at its opposite end to permit a swinging of said popping receptacle from its telescoped position in said base section to a position where the unpopped residue will be discharged and a simultaneous swinging of the upper section relative to said popping receptacle to allow discharge of said residue, and means carried by said upper section and rotatable relative to said popping receptacle for stirring the unpopped corn therein, simultaneously separating the popped from the unpopped corn and intermittently automatically discharging the popped corn through said discharge opening.

8. A corn popper comprising, a base section open at its upper end, a normally stationary popping receptacle having a discharge opening provided therein, telescopically engaged within the open upper end of said base section and hinged to said section at one end thereof, an upper section forming a closure for said base section hinged to said popping receptacle at its opposite end to permit a swinging of said popping receptacle from its telescoped position in said base section to a position where the unpopped residue will be discharged and a simultaneous swinging of the upper section relative to said popping receptacle to allow discharge of said residue, and a rotary discharge device carried by one of said sections for automatically separating the popped from the unpopped corn and intermittently discharging the same through said discharge opening.

9. A corn popper comprising, a base section open at its upper end, a normally stationary popping receptacle having a discharge opening provided therein, telescopically engaged within the open upper end of said base section, and hinged to said section at one end thereof, an upper closure forming section hinged to said popping receptacle at its opposite end to permit a swinging of said popping receptacle from its telescoped position in said base section to a position where the unpopped residue will be discharged and a simultaneous swinging of the upper section relative to said popping receptacle to allow discharge of said residue, means carried by said upper section and rotatable relative to said popping receptacle for stirring the unpopped corn therein, simultaneously separating the popped from the unpopped corn and intermittently automatically discharging the popped corn through said discharge opening, and means for latching said upper section to said base section.

10. A corn popper comprising, a rectangular base section open at its upper end, a normally stationary readily accessible popping receptacle, provided on its one side with a discharge opening, insulated from and telescopically engaging the open upper end of said base section, and hinged to said base section at one end thereof, an upper closure forming section hinged to said popping receptacle at its opposite end, an electric heating element adjacent to and extending approximately throughout the entire surface area of the bottom of said receptacle, an insulating support for said heating element, and relatively rotatable means cooperating with said popping receptacle for stirring the unpopped corn therein, simultaneously separating the popped from the unpopped corn and intermittently automatically discharging the popped corn through said discharge opening.

11. A corn popper comprising, a base section open at its upper end, a normally stationary semi-cylindrical popping receptacle, provided on its one side with a discharge opening, telescopically engaging the open upper end of said base section, the bottom of said receptacle being circular in cross-section and formed with a series of teat-like projections, an upper closure forming section hinged to said popping receptacle, an electric heating element supported by said base section adjacent the bottom of said popping receptacle for effecting a uniform distribution of heat thereto, and a rotary dispensing device carried by said upper section adapted for rotation relative to said popping receptacle for separating the popped from the unpopped corn and intermittently discharging the popped corn through said discharge opening, said dispensing device including a plurality of equi-distantly spaced wire-like members, the outer free ends of which stir through the unpopped corn and impart a rolling motion thereto caused by their contact with said teat-like projections.

12. A corn popper comprising, a base section, a semicylindrical stationary popping receptacle in said base section, provided with a discharge opening, an upper section, forming a closure for said base section, hinged to said popping receptacle, and a revoluble member carried by said closure forming section comprising a wire-like screening portion extending approximately spirally inward toward the axis of rotation of said member and terminating at its inner end in a conical trough-like portion, said screening portion terminating at its outer end in a plurality of wire-like fingers for stirring the unpopped corn in said popping receptacle and simultaneously separating the popped from the unpopped corn.

13. A corn popper comprising, a base section, a semi-cylindrical stationary popping receptacle in said base section, provided with a discharge opening, an upper closure forming section hinged to said popping receptacle and a revoluble member carried by said closure forming section comprising a screening portion extending approximately spirally inward toward the axis of rotation of said member and terminating at its inner end in a conical trough-like portion, said screening portion comprising a plurality of wire-like elements extending transversely of the axis of rotation of said member adapted to stir the unpopped corn in said popping receptacle and simultaneously separate the popped from the unpopped corn and convey the same into the floor of said trough-like portion.

14. A corn popper comprising, a base section, a semi-cylindrical normally stationary popping receptacle in said base section, provided with a discharge opening, an upper section forming a closure for said base section, hinged to said popping receptacle, and a revoluble member carried by said upper section comprising end plates, a wire-like screening portion interposed between said end plates and extending approximately spirally inward toward the axis of rotation of said member and terminating at its inner end in a conical portion constituting a deflecting trough, one of said end plates having an opening in registry with the discharge opening in said popping receptacle into which said conical portion discharges, the outer end of said screening portion terminating in a plurality of wire-like fingers for stirring the unpopped corn in said popping receptacle, simultaneously separating the popped from the unpopped corn and conveying the same into the floor of said discharge trough.

15. A corn popper comprising, a base section, a normally stationary semi-cylindrical popping receptacle in said base section, provided with a discharge opening, an upper closure forming section hinged to said popping receptacle and a rotary member carried by said closure section comprising a pair of end plates, a conical sheet metal deflecting trough interposed between said end plates, a plurality of approximately spirally arranged wire-like screening elements extending over the open top of said trough and terminating at their inner ends substantially flush with the side of said trough, the outer ends of said wire-like elements projecting beyond the ends of said plates and constituting fingers for stirring the unpopped corn in said popping receptacle and simultaneously separating the popped from the unpopped corn, one of said plates having a circular opening in registry with said discharge opening through which said trough intermittently discharges the popped corn.

16. A corn popper comprising, a base section open at its upper end, a normally stationary popping receptacle, having a discharge opening provided therein, telescopically engaged within the open upper end of said base section and hinged to said base section at one end thereof, an upper section forming a closure for said base section hinged to said popping receptacle at its opposite end to permit a swinging of said popping receptacle from its telescoped position in said base section to a position where the unpopped residue will be discharged and a simultaneous swinging of the upper section relative to said popping receptacle to allow discharge of said residue, and a revoluble member carried by said upper section comprising end plates, a wire-like screening portion interposed between said end plates and extending approximately spirally inward toward the axis of rotation of said member and terminating at its inner end in a conical portion constituting a deflecting trough, one of said end plates having an opening in registry with the discharge opening in said popping receptacle into which said conical portion discharges, the outer end of said screening portion terminating in a plurality of wire-like fingers adapted for stirring the unpopped corn in said popping receptacle, simultaneously separating the popped from the unpopped corn and conveying the same into the floor of said discharge trough.

17. A corn popper comprising, a base section open at its upper end, a normally stationary popping receptacle, having a discharge opening provided therein, telescopically engaged within the open upper end of said base section and hinged to said base section at one end thereof, an upper closure forming section hinged to said popping receptacle at its opposite end to permit swinging of said popping receptacle from its telescoped position in said base section to a position where the unpopped residue will be discharged and a simultaneous swinging of the upper section relative to said popping receptacle to allow discharge of said residue, a revoluble member carried by said upper section comprising end plates, a wire-like screening portion interposed between said end plates and extending approximately spirally inward toward the axis of rotation of said member and terminating at its inner end in a conical portion constituting a deflecting trough, one of said end plates having an opening in registry with the discharge opening in said popping receptacle into which said conical portion discharges, the outer end of said screening portion terminating in a plurality of wire-like fingers adapted for stirring the unpopped corn in said popping receptacle, simultaneously separating the popped from the unpopped corn and conveying the same into the floor of said discharge trough, and means for latching said closure forming section to said base section.

18. A corn popper comprising, a base section open at its upper end, a normally stationary popping receptacle, having a discharge opening provided therein, telescopically engaged within the open upper end of said base section and hinged to said section at one end thereof, an upper closure forming section hinged to said popping receptacle at its opposite end to permit swinging of said popping receptacle from its telescoped position in said base section to a position where the unpopped residue will be discharged and a simultaneous swinging of the upper section relative to said popping receptacle to allow discharge of said residue, an electric heating element adacent to and extending approximately throughout the entire surface area of the bottom of said receptacle, an insulating support for said heating element, and a revoluble member carried by said upper section comprising end plates, a wire-like screening portion interposed between said end plates and extending approximately spirally inward toward the axis of rotation of said member and terminating at its inner end in a conical portion constituting a deflecting trough, one of said end plates having an opening in registry with the discharge opening in said popping receptacle into which said conical portion discharges, the outer end of said screening portion terminating in a plurality of wire-like fingers adapted for stirring the unpopped corn in said popping receptacle, simultaneously separating the popped from the unpopped corn and conveying the same into the floor of said discharge trough.

WILBUR E. STITZ.